(12) United States Patent
Grassens

(10) Patent No.: US 7,231,633 B2
(45) Date of Patent: Jun. 12, 2007

(54) DEBUGGING WITH SET VERBOSITY LEVEL DURING READ AND ANALYSIS OF EXECUTABLE CODE AND ASSOCIATED COMMENTS WHILE LOGGING ACCORDING TO SET VERBOSITY LEVEL

(75) Inventor: Leonardus Grassens, Loveland, CO (US)

(73) Assignee: LSI Corporation, Milpitas, CA (US)

( * ) Notice: Subject to any disclaimer, the term of this patent is extended or adjusted under 35 U.S.C. 154(b) by 736 days.

(21) Appl. No.: 10/620,680

(22) Filed: Jul. 15, 2003

(65) Prior Publication Data

US 2005/0015751 A1    Jan. 20, 2005

(51) Int. Cl.
*G06F 9/44* (2006.01)

(52) U.S. Cl. .................. 717/124; 717/112; 717/143

(58) Field of Classification Search ............ 717/124, 717/125–133, 141–144, 112
See application file for complete search history.

(56) References Cited

U.S. PATENT DOCUMENTS

| | | | | |
|---|---|---|---|---|
| 5,325,531 A * | 6/1994 | McKeeman et al. | ........ | 717/145 |
| 5,339,433 A * | 8/1994 | Frid-Nielsen | ........ | 717/141 |
| 5,481,712 A * | 1/1996 | Silver et al. | ........ | 717/109 |
| 5,557,730 A * | 9/1996 | Frid-Nielsen | ........ | 715/839 |
| 5,603,021 A * | 2/1997 | Spencer et al. | ........ | 707/4 |
| 5,737,608 A * | 4/1998 | Van De Vanter | ........ | 717/112 |
| 5,740,444 A * | 4/1998 | Frid-Nielsen | ........ | 717/102 |
| 5,746,975 A * | 5/1998 | Chateau | ........ | 422/61 |
| 5,752,058 A * | 5/1998 | Van De Vanter | ........ | 715/531 |
| 5,799,268 A * | 8/1998 | Boguraev | ........ | 704/9 |
| 5,802,262 A * | 9/1998 | Van De Vanter | ........ | 714/1 |
| 5,805,889 A * | 9/1998 | Van De Vanter | ........ | 717/107 |
| 5,813,019 A * | 9/1998 | Van De Vanter | ........ | 715/512 |
| 5,857,212 A * | 1/1999 | Van De Vanter | ........ | 715/519 |
| 5,923,881 A * | 7/1999 | Fujii et al. | ........ | 717/125 |
| 5,946,493 A * | 8/1999 | Hanson | ........ | 717/124 |
| 6,305,006 B1 * | 10/2001 | Markov | ........ | 716/18 |
| 6,311,327 B1 * | 10/2001 | O'Brien et al. | ........ | 717/114 |
| 6,463,578 B1 * | 10/2002 | Johnson | ........ | 717/124 |
| 6,542,899 B1 * | 4/2003 | Saulpaugh et al. | ........ | 707/103 R |
| 6,572,661 B1 * | 6/2003 | Stern | ........ | 715/501.1 |
| 6,651,241 B1 * | 11/2003 | Hernandez, III | ........ | 717/112 |
| 6,681,343 B1 * | 1/2004 | Nakabo | ........ | 714/38 |
| 6,698,013 B1 * | 2/2004 | Bertero et al. | ........ | 717/127 |
| 6,961,924 B2 * | 11/2005 | Bates et al. | ........ | 717/125 |
| 6,964,036 B2 * | 11/2005 | Bates et al. | ........ | 717/125 |

OTHER PUBLICATIONS

The Design of Distributed Hyperlinked Programming Documentation, Lisa Friendly, Sun, 1995, pp. 1-25.*
Literate Programming Simplied, N. Ramsey, IEEE, 1994, pp. 97-105.*
How Debuggers Work, J.B. Rosenberg, p. 25, 1996.*
The PAN Language-Based Editing System, Robert A. Balance et al, ACM, Jan. 1992, pp. 95-127.*
Practical Language-Based Editing for Software Engineers, Michael L. Van De Vanter, Sun MicroSystens Inc, pp. 251-167, 1995.*
Automatic Generation of Help from Interface Design Models, Robert Moriyan et al, ACM, 1994, pp. 225-231.*

* cited by examiner

*Primary Examiner*—Todd Ingberg
(74) *Attorney, Agent, or Firm*—Cochran Freund & Young LLC

(57) ABSTRACT

A debugging tool for computer program development that analyzes the computer program adds output statements at strategic locations throughout the program. The output statements may include the filename and line number of the original source code and may further include a listing of the executed command as well as values of certain expressions and/or variables as defined by the requested verbosity. The verbosity may be set at different levels throughout the source code as required.

19 Claims, 5 Drawing Sheets

```
int main( int argc, char *argv[] ) {
    int inside_comment = 0, trace_declared = 0, trace_opened = 0;
    int i, n;
    char file_name[MAX_LINE_LEN];
    FILE *infile, *outfile;
    char save_dir[MAX_LINE_LEN];

if(!(argc == 4)) {
        printf("Useage: codetracer <input path> <output path> <file spec>\n\ncodetracer testdir outdir *.cpp\n");
        printf("or\n\n\ncodetracer this outdir *.cpp\n");
        exit( 0 );
    }
    else {
        printf( "Program codetracer version %s\n", VERSION );
    }
    // save path of the directory where we start
    if ( _getcwd( save_dir, _MAX_PATH ) == NULL ) {
        printf( "Could not find path of current directory\n" );
        exit( -2 );
    }
..etc.
```

300 SOURCE CODE

FIGURE 3

```
FILE *trace;
int main( int argc, char *argv[] ) {
    trace = fopen( "trace.txt", "wt" );     // <<<<< This line is inserted by the tool
fprintf(trace,"codetracer.cpp 0028: ");     // <<<<< This line is inserted by the tool
fprintf(trace,"codetracer.cpp 0029: int main( int argc, char *argv[] ) {\n");
trace_opened = 0;\n");
    int inside_comment = 0, trace_declared = 0, trace_opened = 0;
fprintf(trace,"codetracer.cpp 0030:     int i, n;\n");
    int i, n;
fprintf(trace,"codetracer.cpp 0031:     char file_name[MAX_LINE_LEN];\n");
    char file_name[MAX_LINE_LEN];
fprintf(trace,"codetracer.cpp 0032:     FILE *infile, *outfile;\n");
    FILE *infile, *outfile;
fprintf(trace,"codetracer.cpp 0033:     char save_dir[MAX_LINE_LEN];\n");
    char save_dir[MAX_LINE_LEN];

fprintf(trace,"codetracer.cpp 0035:     if(!(argc == 4)) (\n");
    if(!(argc == 4)) {
        printf("Useage: codetracer <input path> <output path> <file spec>\n\ncodetracer
testdir outdir *.cpp\n" );
        printf("or\n\ncodetracer this outdir *.cpp\n");
fprintf(trace,"codetracer.cpp 0038:         exit( 0 );\n");
        exit( 0 );
    }
    else {
fprintf(trace,"codetracer.cpp 0040:     else (\n");
        printf( "Program codetracer version %s\n", VERSION );
fprintf(trace,"codetracer.cpp 0043:     // save path of the directory where we start\n");
    // save path of the directory where we start
fprintf(trace,"codetracer.cpp 0044:     if ( _getcwd( save_dir, _MAX_PATH ) == NULL )
(\n");
    if ( _getcwd( save_dir, _MAX_PATH ) == NULL ) {
        printf( "Could not find path of current directory\n" );
fprintf(trace,"codetracer.cpp 0046:         exit( -2 );\n");
        exit( -2 );
    }
...etc.
```

400
ANNOTATED
SOURCE CODE

FIGURE 4

```
502 FILENAME   504 LINE NUMBER                                                       OUTPUT
codetracer.cpp 0028: int main( int argc, char *argv[] ) {                              FILE
codetracer.cpp 0030:   int inside_comment = 0, trace_declared = 0, trace_opened = 0;   500
codetracer.cpp 0031:   int i, n;
codetracer.cpp 0032:   char file_name[MAX_LINE_LEN];
codetracer.cpp 0033:   FILE *infile, *outfile;
codetracer.cpp 0034:   char save_dir[MAX_LINE_LEN];
codetracer.cpp 0036:   if(!(argc == 4)) {
codetracer.cpp 0041:   else {
codetracer.cpp 0045:     // save path of the directory where we start
codetracer.cpp 0046:     if ( _getcwd( save_dir, _MAX_PATH ) == NULL ) {
codetracer.cpp 0051:     if( !strstr( argv[1], "this" )) {
codetracer.cpp 0064:     else {
codetracer.cpp 0065:       n = FindFiles( argv[3] );

utility.cpp 0118:   static int tree_depth = 0, i = 0;
utility.cpp 0119:   struct _finddata_t file;
utility.cpp 0120:   long hFile;
utility.cpp 0121:   int success = 1;
utility.cpp 0122:   static int index = 0;
utility.cpp 0124:   // search for the first file in the current directory
utility.cpp 0125:   if( (hFile = _findfirst( spec1, &file )) == -1L ) {
utility.cpp 0130:   while( success != -1L ) {
utility.cpp 0131:     if( file.name[0] != '.' ) {
utility.cpp 0132:       if(( file.attrib & _A_SUBDIR ) ==_A_SUBDIR ) {
utility.cpp 0144:       else { // it is a real filename
utility.cpp 0145:         strcpy( file_name_array[index], file.name );
utility.cpp 0146:         index++;
utility.cpp 0150:       // read next file and see if success
utility.cpp 0151:       success = _findnext( hFile, &file );
utility.cpp 0131:     if( file.name[0] != '.' ) {
utility.cpp 0132:       if(( file.attrib & _A_SUBDIR ) ==_A_SUBDIR ) {
utility.cpp 0144:       else { // it is a real filename
utility.cpp 0145:         strcpy( file_name_array[index], file.name );
utility.cpp 0146:         index++;
utility.cpp 0150:     // read next file and see if success
utility.cpp 0151:     success = _findnext( hFile, &file );
utility.cpp 0154:   if( tree_depth > 0 ) { // go up in the directory tree
utility.cpp 0158:   return index;

codetracer.cpp 0067:   max_name_length = 0;
codetracer.cpp 0068:   for( i = 0; i<n; i++ ) {
codetracer.cpp 0069:     if( (int)max_name_length<(int)strlen(file_name_array[i])) {
```

FIGURE 5

DEBUGGING WITH SET VERBOSITY LEVEL DURING READ AND ANALYSIS OF EXECUTABLE CODE AND ASSOCIATED COMMENTS WHILE LOGGING ACCORDING TO SET VERBOSITY LEVEL

BACKGROUND OF THE INVENTION a. Field of the Invention

The present invention pertains to computer program development tools and specifically to automated tools for facilitating debugging of computer programs.

b. Description of the Background

Testing and debugging computer code is typically a large portion of the development cycle of a computer program. Several program development environments are specifically constructed to aid a developer in the writing, editing, testing and debugging of code by enabling the developer to step into and through the code, evaluate variable values, etc. Such development environments are not always available to those developers whose applications are not supported by the environments.

It is commonplace for software developers to insert print statements at periodic intervals throughout their program so that the state of the program may be monitored when the program is run. These print statements are time consuming to write and may require a working knowledge of the function of the code to place the statements in the proper locations.

It would therefore be advantageous to provide a system and method for automatically placing debugging statements into a program that may enable a tester or developer to efficiently trace the flow of the program and help in debugging the program. It would be additionally advantageous if such a system and method were adaptable to different depths of debugging and different debugging techniques.

SUMMARY OF THE INVENTION

The present invention overcomes the disadvantages and limitations of the prior art by providing a system and method for placing output statements at periodic intervals throughout the source code of a computer program. The computer program is analyzed for proper locations for output statements which may have different levels of verbosity that are controllable within the source code and by the debugging program.

In a low verbosity level, the source code may be analyzed to find each function call or subroutine, wherein an output statement may be inserted. In a high verbosity level, an output statement may be inserted for each functional line of the source code. In some embodiments, the logic levels of certain statements or variable values may be included in the output statements.

When the source code is executed with the embedded output statements, a log file may be generated that aids the developer to trace the actual execution of the program at various levels of detail. The log file may contain the necessary information to enable the developer to quickly locate the specific line of code in a specific file that was being executed at a particular point in time.

The present invention may therefore comprise a computerized method for adding debugging statements to a computer source code having a plurality of lines of code comprising: creating a first output file; setting a verbosity level to a predetermined level; traversing through the computer source code by reading and analyzing a portion of the source code at a time, the reading and analyzing comprising: reading the portion of the source code, the portion comprising executable statements and comments; and if the portion comprises an executable statement, writing the executable statement to the output file, constructing an output statement comprising at least an indicator of the location of the executable statement within the source code, and writing the output statement to the output file; and causing the output file to be executed in place of the computer source code.

The present invention may further comprise a computer program for adding debugging statements to a computer source code having a plurality of lines of code comprising: a first routine for creating a first output file; the ability to set a verbosity level to a predetermined level; a second routine for traversing through the computer source code by reading and analyzing a portion of the source code at a time, the reading and analyzing comprising: reading the portion of the source code, the portion comprising executable statements and comments; and if the portion comprises an executable statement, writing the executable statement to the output file, constructing an output statement comprising at least an indicator of the location of the executable statement within the source code, and writing the output statement to the output file; and wherein the output file may be executed in place of the computer source code.

The advantages of the present invention are that a computer program source code may be automatically modified on a selective basis that greatly facilitates debugging and tracing of a computer program. The system and method may operate on source code that comprises a plurality of source code files. The modified computer source code may provide a trace file that identifies the specific location that was executed and may optionally provide various key values and variables when required, thus greatly speeding up code testing and debugging activities.

BRIEF DESCRIPTION OF THE DRAWINGS

In the drawings,

FIG. 3 is an illustration of a snippet of source code prior to having the annotated lines added thereto.

FIG. 4 is an illustration of an annotated version of the snippet of code from FIG. 3.

FIG. 5 is an illustration of an output file that is generated when the source code of FIG. 4 is executed.

DETAILED DESCRIPTION OF THE INVENTION

Figure 1:
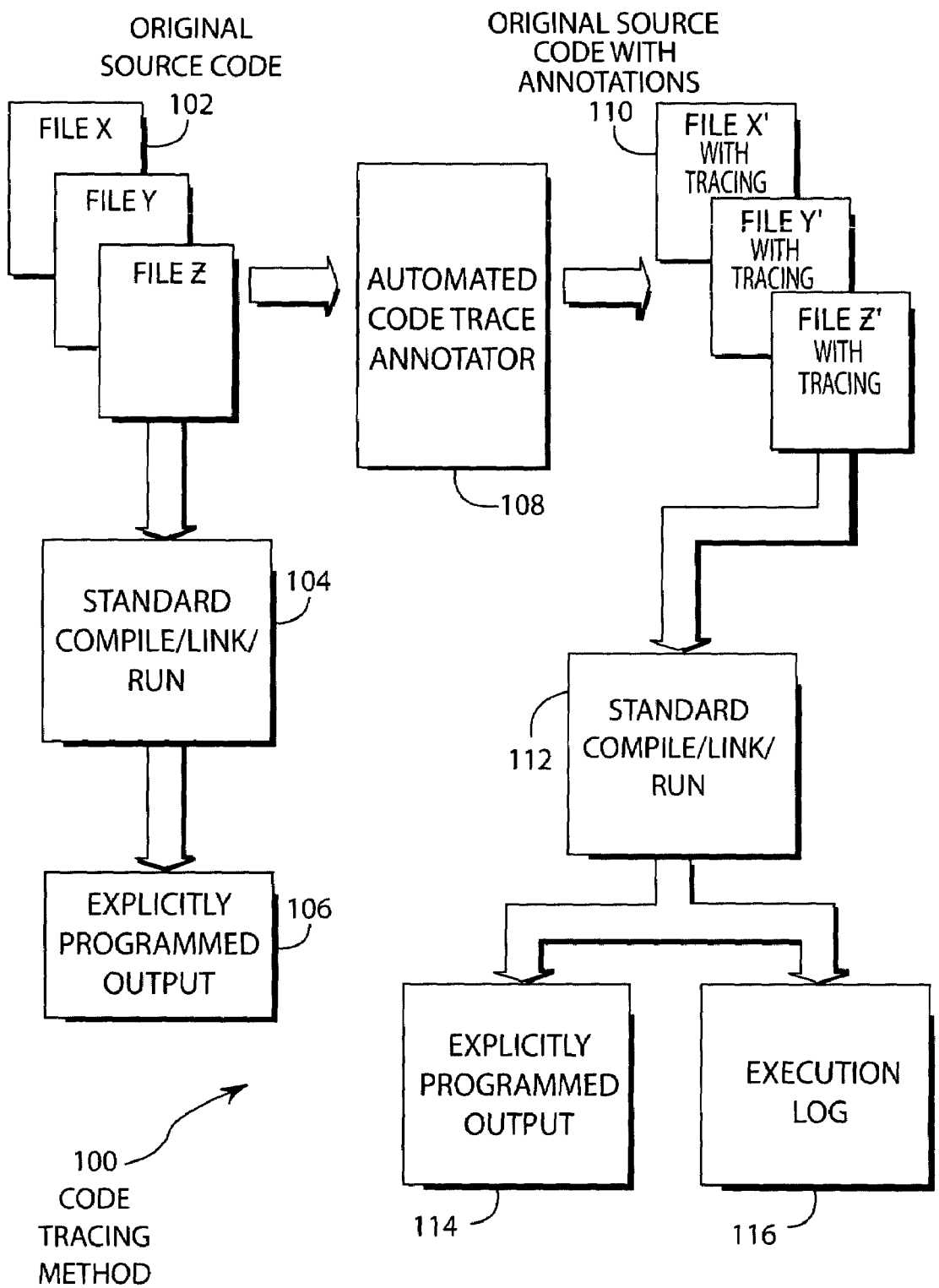
FIG. 1 is an illustration of an embodiment of the present invention showing a overall method for generating annotated source code.

FIG. 1 illustrates an embodiment 100 of the present invention showing an overall method for generating annotated source code. The original source code 102 may comprise several files. The source code 102 may be compiled and executed 104 to create the normal output 106. In order to debug the source code 102, an automated code trace annotator 108 may generate annotated source code 110 that may be compiled and executed 112 using the same compiler as in block 104. The annotated source code may output the normal output 114 in addition to an execution log 116.

The embodiment 100 provides a way for source code 102 to be annotated such that code tracing and debugging can be efficiently performed. By automating the process of annotating the code, a developer may quickly determine how the program executes in order to determine if the program is operating as intended.

The automated code trace annotator 108 systematically steps through the source code 102 and adds output statements that create the execution log 116 when the annotated code is executed. The output statements may indicate function calls, specific lines of the code that are executed, original source code file names, variable values, or other information as may be deemed necessary.

The embodiment 100 allows the source code 102 to be executed with a series of annotation output statements while not adding the annotation output statements to the final version of the source code 102. In other words, a debugging scenario may operate as follows: the source code 102 may be annotated by the automated code trace annotator 108 and executed to determine a portion of the source code 102 to change. Those changes may be incorporated into the source code 102, the automated code trace annotator 108 may be re-executed, and the modified source code may be evaluated. Using this scenario, the source code 102 may be continually modified without having to add and remove debugging statements.

The method 100 may be adapted to virtually any type of computer programming environment and language. The method 100 is particularly suited to those programming environments where powerful debugging tools may not have been developed or where such tools are incapable of tracing and debugging various aspects of programs developed in such environments.

The automated code trace annotator 108 may have different levels of verbosity that may be set to have various types of information shown in the execution log 116 at runtime. For example, a low verbosity level may cause only high level function calls to be added to the execution log 116. A medium verbosity level may cause each executable statement to be written to the execution log 116. A high verbosity level may cause each variable and value of each variable to be written to the execution log 116 in addition to each executable statement. Various verbosity levels and attributes may be created by those skilled in the arts while maintaining within the spirit and scope of the present invention.

The automated code trace annotator 108 may be a standalone program or may be incorporated into a compiler, interpreter, or other program that is used to execute the source code 102.

Figure 2:
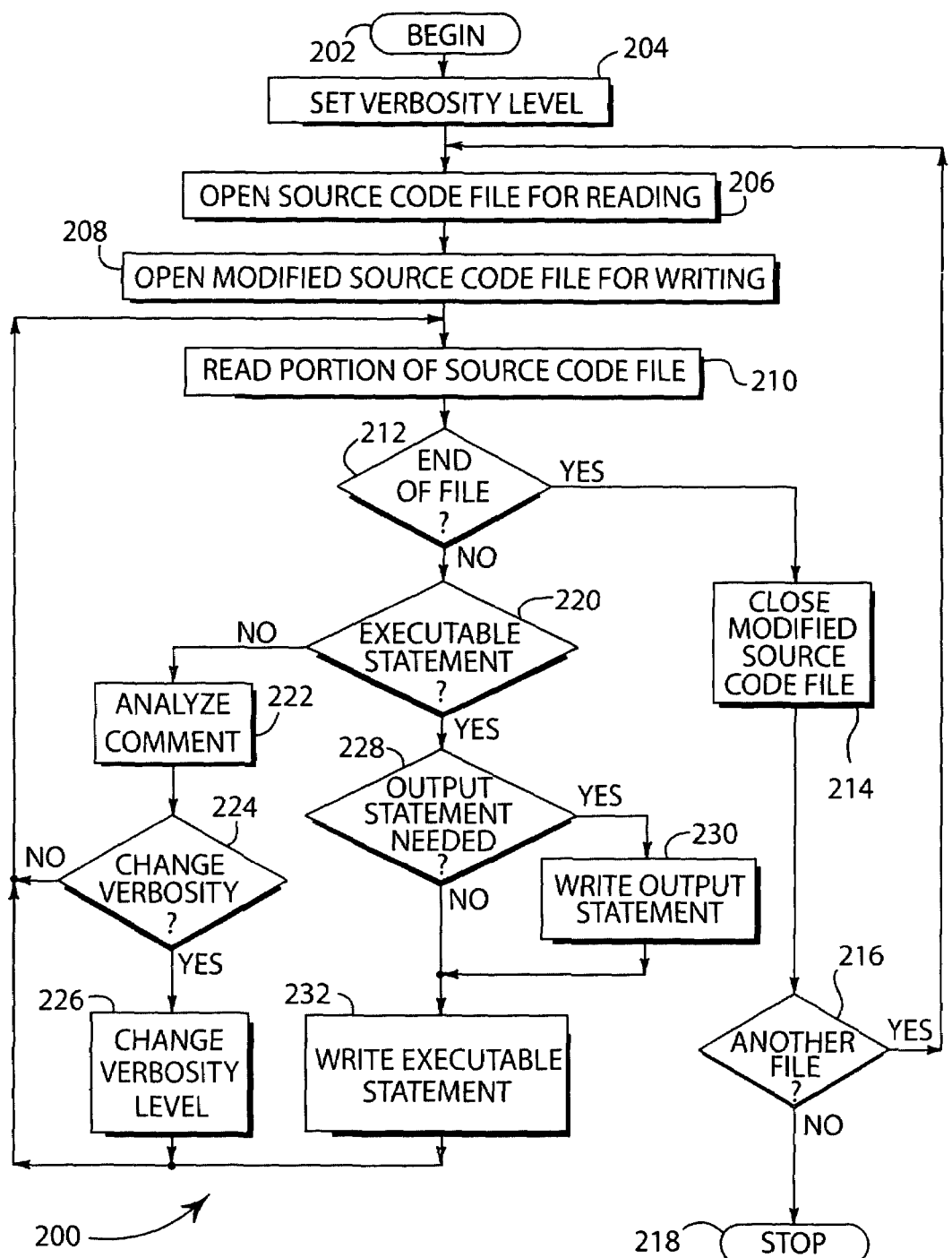
FIG. 2 is an illustration of an embodiment of the present invention showing a method for annotating source code.

FIG. 2 illustrates an embodiment 200 of the present invention showing a method for annotating source code. The method begins in block 202. The verbosity level is set in block 204. The source code file is opened for reading in block 206 and the modified source code file is opened for writing in block 208. A portion of the source code file is read in block 210. If an end of file is encountered in block 212, the modified source code file is closed in block 214 and if another file is to be annotated in block 216, the process resumes at block 206, otherwise the process ends in block 218. If the end of file was not encountered in block 212, the portion of code is evaluated to see if it is an executable statement in block 220.

If the portion of code is not an executable statement in block 220, then it is further analyzed in block 222 to see if an embedded command in a comment block changes the verbosity. If the verbosity is to be changed in block 224, the level is changed in block 226, otherwise, the process resumes at block 210.

If the portion of code is an executable statement in block 220, block 228 evaluates whether an output statement should be generated. If an output block is needed in block 228, it is generated in block 230, otherwise an executable statement is written in block 232 and the process resumes at block 210.

The portion of source code that is read in block 210 may be a single line or statement. In some programming languages, a single statement may span multiple lines. In other languages, multiple statements may be placed in a single line while still other languages require only one statement per line. The specific syntax of the language may have specific rules for statement and command construction that may need to be consulted when reading a useable portion of the source code file.

The embodiment 200 may operate on several files sequentially. For example, it may be common practice to place all the source code files for a specific programming project into a single directory. The embodiment 200 may be adapted to search through each file of the directory and create a corresponding annotated version of that source code in that directory or a separate one.

In some embodiments, the annotated files may be given a new file name, while in other embodiments, the newly annotated files may be kept in a separate directory. Those skilled in the arts will appreciate that changing the filenames of included or linked files may present some challenges to the developer and thereby may be less desirable when an embodiment is directed towards applications with multiple linked files.

The comment areas of the source code may include embedded commands that serve to change the verbosity level at different points throughout the annotation process. For example, a frequently called and highly tested subroutine or function may have a low verbosity level that only includes an output line that indicates that the subroutine or function was called. In another area of the source code, embedded commands in the comment areas may be used to increase the verbosity level for code that is not thoroughly tested.

The output statement that is written in block 230 may include an indicator to the location of the program execution. The indicator may include the file name and line number of the executed statement or any other indicator as one skilled in the art may desire.

The output statement may further comprise a copy of the executed command for that portion of source code. The executed command may have variables and their values included in the output statement to further aid the developer in debugging the program.

FIG. 3 illustrates a snippet of source code 300 prior to having the annotated lines added thereto. The source code example is in the C language.

FIG. 4 illustrates an annotated version 400 of the snippet of code from FIG. 3. The output statements include the "fprintf" statements located in many locations through the code.

FIG. 5 illustrates an output file 500 that is generated when the source code of FIG. 4 is executed. For each line of the output file 500, there is a source file name 502, a line number 504, and the executed statement 506.

The output file 500 provides a developer with a simple way to trace the function of the source code as well as provides the necessary reference information to locate a line of code that the developer may wish to modify. In the case where the program abnormally terminates execution, the last executed line of code plus the file and line number of that source code will be the last line of the output file. By analyzing the output file directly, the developer may trace the logic of the code in order to identify areas of the source code to modify.

In some embodiments, the output file 500 may include variable listings or may display the various expressions that are evaluated in that line of code. For example, in the case of an IF statement, the output file 500 may include the value of the expression within the IF statement by some mechanism. Such a mechanism may include providing a "T" or "F" indicator at the beginning or end of the line. Other mechanisms include changing the color or other visual indicator of the text in the output file. Those skilled in the arts may use various methods of indication for expressions and variable values while keeping within the spirit and intent of the present invention.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A computerized method for debugging a computer source code having a plurality of lines of code comprising:
   creating a separate computer source code to hold an annotated source code;
   setting a verbosity level to a predetermined level;
   traversing through said computer source code by reading and analyzing a portion of said computer source code from a start to an end of said computer source code one portion of said computer source code at a time, said reading and analyzing comprising:
      reading said portion of said computer source code, said portion of said computer source code comprising executable statements and comments;
      determining if said portion of said computer source code comprises an executable statement;
      writing said executable statement to said annotated source code if said portion of said computer source code comprises said executable statement;
      reading said verbosity level to determine desired content for said annotated source code;
      constructing an output statement comprising said desired content for said executable statement according to said verbosity level, said output statement further comprising commands that write said desired content to a log file;
      writing said output statement to said annotated source code; and
      repeating said steps of reading and analyzing said portion of said computer source code on a next portion of said computer source code until said end of said computer source code is reached;
   causing said annotated source code to be executed in place of said computer source code such that said annotated source code operation is recorded in said log file; and
   evaluating said log file to find problems with said computer source code.

2. The method of claim 1 wherein said computer source code is used with a compiler.

3. The method of claim 1 wherein said computer source code is used with an interpreter.

4. The method of claim 1 wherein said reading and analyzing of said portion of said computer source code further comprises:
   determining if said portion of said computer source code comprises a comment;
   analyzing said comment to determine that said comment contains an embedded verbosity level statement defining an embedded verbosity level; and
   setting said verbosity level to said embedded verbosity level defined in said embedded verbosity level statement.

5. The method of claim 1 wherein said output statement is comprised of at least an indicator of the location of said executable statement within said computer source code.

6. The method of claim 5 wherein said indicator of the location of said executable statement comprises:
   a file name of said source code; and
   a line number of said portion of said source code.

7. The method of claim 5 wherein said output statement further comprises at least a portion of said executable statement.

8. The method of claim 5 wherein said output statement further comprises at least one variable name and at least one variable value.

9. The method of claim 5 wherein said output statement further comprises a function name.

10. The method of claim 1 further comprising:
    updating said computer source code to correct said problems with said computer source code;
    deleting said annotated source code;
    performing said computerized method for debugging said computer source code on said updated computer source code such that a new annotated source code is created, executed and evaluated; and
    repeating until said computer source code operation is deemed satisfactory.

11. A computer program that assists debugging of a computer source code having a plurality of lines of code comprising:
    a first routine that creates a separate computer source code to hold an annotated source code;
    a second routine that sets a verbosity level to a predetermined level;
    a third routine that traverses through said computer source code and reads and analyzes a portion of said computer source code from a start to an end of said computer source code one portion of said computer source code at a time, said reading and analyzing comprising:
       a first subroutine that reads said portion of said computer source code, said portion of said computer source code being comprised of executable statements and comments;
       a second subroutine that determines if said portion of said computer source code is comprised of an executable statement;
       a third subroutine that writes said executable statement to said annotated source code if said portion of said computer source code comprises said executable statement;
       a fourth subroutine that reads said verbosity level to determine desired contect for said annotated source code;

a fifth subroutine that constructs an output statement comprised of said desired content for said executable statement according to said verbosity level, said output statement further comprised of commands that write said desired content to a log file;

a sixth subroutine that writes said output statement to said annotated source code; and a seventh subroutine that repeats said reading and analyzing of said portion of said computer source code on a next portion of said computer source code until said end of said computer source code is reached; and wherein said annotated source code may be executed in place of said computer source code such that said annotated source code operation is recorded in said log file and said log file may be evaluated to find problems with said computer source code.

12. The computer program of claim 11 wherein said computer source code is used with a compiler.

13. The computer program of claim 11 wherein said computer source code is used with an interpreter.

14. The computer program of claim 11 wherein said reading and analyzing of said portion of said computer source code further comprises:

an eight subroutine that determines if said portion of said computer source code comprises a comment;

a ninth subroutine that analyzes said comment to determine if said comment contains an embedded verbosity level statement defining an embedded verbosity level; and a tenth subroutine that sets said verbosity level to said embedded verbosity level defined in said embedded verbosity level statement.

15. The computer program of claim 11 wherein said output statement is comprised of at least an indicator of the location of said executable statement within said computer source code.

16. The computer program of claim 15 wherein said indicator of the location of said executable statement comprises:

a file name of said source code; and a line number of said portion of said source code.

17. The computer program of claim 15 wherein said output statement further comprises at least a portion of said executable statement.

18. The computer program of claim 15 wherein said output statement further comprises at least one variable name and at least one variable value.

19. The computer program of claim 15 wherein said output statement further comprises a function name.

* * * * *